United States Patent [19]
Rekesius

[11] 3,974,759
[45] Aug. 17, 1976

[54] APPARATUS FOR TOASTING BREAD-LIKE ARTICLES

[75] Inventor: John F. Rekesius, Point Pleasant, N.J.

[73] Assignee: Alco Foodservice Equipment Company, Neptune, N.J.

[22] Filed: May 20, 1974

[21] Appl. No.: 471,470

[52] U.S. Cl. ............................................. 99/386
[51] Int. Cl.² ..................................... A47J 37/08
[58] Field of Search ................... 99/386; 431/48, 58

[56] References Cited
UNITED STATES PATENTS

| | | | |
|---|---|---|---|
| 2,889,872 | 6/1959 | Suesserott | 431/48 X |
| 3,115,926 | 12/1963 | Ray | 431/48 X |
| 3,386,656 | 6/1968 | Bergquist | 431/48 X |
| 3,575,542 | 4/1971 | Branson | 431/58 |
| 3,693,536 | 9/1972 | Carville | 99/386 |
| 3,721,178 | 3/1973 | Szabrak | 99/386 |
| 3,835,760 | 9/1974 | Rekesius | 99/386 X |

Primary Examiner—Stanley N. Gilreath
Assistant Examiner—Donald B. Massenberg
Attorney, Agent, or Firm—Meyer, Tilberry & Body

[57] ABSTRACT

Improved gas burner type apparatus for toasting bread-like articles is disclosed. The apparatus includes a housing providing a chamber including a toasting zone through which articles are carried by conveyor means. The toasting zone includes a pair of gas burners between which the articles are conveyed, and gas flow through the burners is controlled to provide, selectively, for toasting one or both sides of the articles.

9 Claims, 5 Drawing Figures

APPARATUS FOR TOASTING BREAD-LIKE ARTICLES

This invention relates to the art of cooking and, more particularly, to gas burner type apparatus for toasting bread-like articles.

Gas burner type toasting devices have been provided heretofore and find particular utility in commercial establishments such as restaurants where high output requirements are encountered for toasting bread, buns and the like. Such toasting devices are comprised of a housing defining a toasting chamber in which an article conveyor is disposed together with gas burners and ceramic grids. The gas burners and grids are disposed in a toasting zone in the chamber, and a run of the conveyor passes between the grids and burners. The conveyor generally is motor driven and is operable to receive and continuously move bread-like articles through the toasting zone. As the articles pass between the gas burners and grids they are toasted, and the articles are then displaced from the conveyor for removal from the housing.

In certain gas burner type toasting devices heretofore provided, the heat output of the two burners is in effect fixed. Accordingly, the bread-like articles are toasted on both sides thereof during passage through the toasting zone. Such toasting is, of course, desirable where the article is a slice of bread. Often, however, it is desirable to toast a bun product, such as a hamburger bun, which is cut in half and the halves of which are deposited on the conveyor. Such bun products have an outer crust, and it is more desirable to toast the inner faces of the bun halves as defined by cutting thereof and to heat but not toast the crusted faces. This cannot be achieved if the heat output of the burners is fixed for toasting and, accordingly, with such a toasting device both sides of the bun halves must be toasted.

In order to achieve the desired toasting of the cut faces of bun halves and heating of the crusted faces thereof, it has been necessary heretofore to structurally modify a toasting device of the foregoing character to minimize gas flow to the one of the burners facing the crusted sides of the bun. In this respect, for example, a flow restriction is provided in the gas line to the one burner to minimize the burner flame and thus reduce the heat output thereof. Such a restriction is in effect built in and not subject to change other than by experienced maintenance personnel. Accordingly, the toasting device is operable only to toast and heat the opposite sides of an article. Thus, if a bread slice is conveyed through such a device, only one side of the slice is toasted to the desired extent.

With toasting devices of the foregoing character, one device of each type is required to provide an establishment with the ability to toast bread-like articles on both sides thereof and to toast one side of an article and only heat the other side thereof. Accordingly, equipment cost to the establishment is increased as is the maintenance costs required to maintain two devices rather than one. Further, additional counter space is required for two devices, and operating costs are increased by requiring maintenance of pilot flames for four burners rather than two when the devices are not being operated to toast articles.

In accordance with the present invention, an improved gas burner type toasting device is provided which overcomes the foregoing disadvantages and others of such previous toasting devices. In this respect, the improved gas burner type toasting device of the present invention advantageously provides, in a single structure the capability of selectively toasting articles on both sides thereof or toasting articles on one side and just heating the other side thereof. such selectivity is achieved by providing a gas flow control arrangement in connection with one of the burners which is selectively operable to provide gas flow to the one burner at first and second flow rates. The first flow rate provides for the heat output of the burner to achieve toasting of the corresponding side of an article, and the second flow rate is less than the first flow rate and provides for the heat output of the one burner to only heat the corresponding side of the article. Gas flow to the other burner is at a flow rate which provides for the heat output of the latter burner to achieve toasting of the corresponding side of the article.

In a preferred embodiment, gas flow to the one burner is through a primary flow line and a bypass line, and a valve is provided in the primary line to selectively open and close the latter to gas flow to the burner. Preferably, the valve is a solenoid valve controlled by a switch on the housing of the device. The switch has two modes or positions corresponding one to toasting articles on both sides and the other to toasting one side and heating the other. When the switch is in the one position, the solenoid valve is open and gas flow to the burner is at the first flow rate. When the switch is in the other position, the solenoid valve is closed and gas flow to the burner is through the bypass line and at the second and lower flow rate. During operation of the toasting device, gas flow to the second burner is at a substantially constant rate. Accordingly, it will be appreciated that in the preferred embodiment it is only necessary to flip a control switch on the housing to modify the function of the device with respect to the two capabilities thereof.

In accordance with another aspect of the present invention, gas supply to both of the burners is controlled through a safety solenoid valve in the primary supply line, and control circuitry is provided in connection with the burners and valves to achieve a complete shut off of gas flow to the burners should the pilot flames for one or the other or both of the burners be extinguished. Moreover, the control circuitry advantageously includes an on-off switch for the apparatus, and it is only necessary to actuate the latter switch to the on position following a period of non-use to achieve burner ignition.

It is accordingly an outstanding object of the present invention to provide improved gas burner type toasting apparatus for bread-like articles.

Another object is the provision of improved apparatus of the foregoing character which is selectively operable to toast articles on both sides, or toast articles on one side and heat the other side thereof.

Still another object is the provision of improved apparatus of the foregoing character in which the gas supply to the burners is selectively controlled to provide for one of the burners to be operable at two different levels of heat output to achieve different heating functions.

A further object is the provision of improved apparatus of the foregoing character having a unique gas flow control arrangement including a safety valve which is responsive to an adverse condition in the apparatus to shut off the gas supply to the burners.

Yet a further object is the provision of improved apparatus of the foregoing character which, for the given capabilities thereof, is more economical to construct, operate and maintain than devices heretofore required to achieve the same capabilities.

The foregoing objects, and others, will in part be obvious and in part pointed out more fully hereinafter in conjunction with the written description of a preferred embodiment of the invention illustrated in the accompanying drawings in which.

Figure 1:
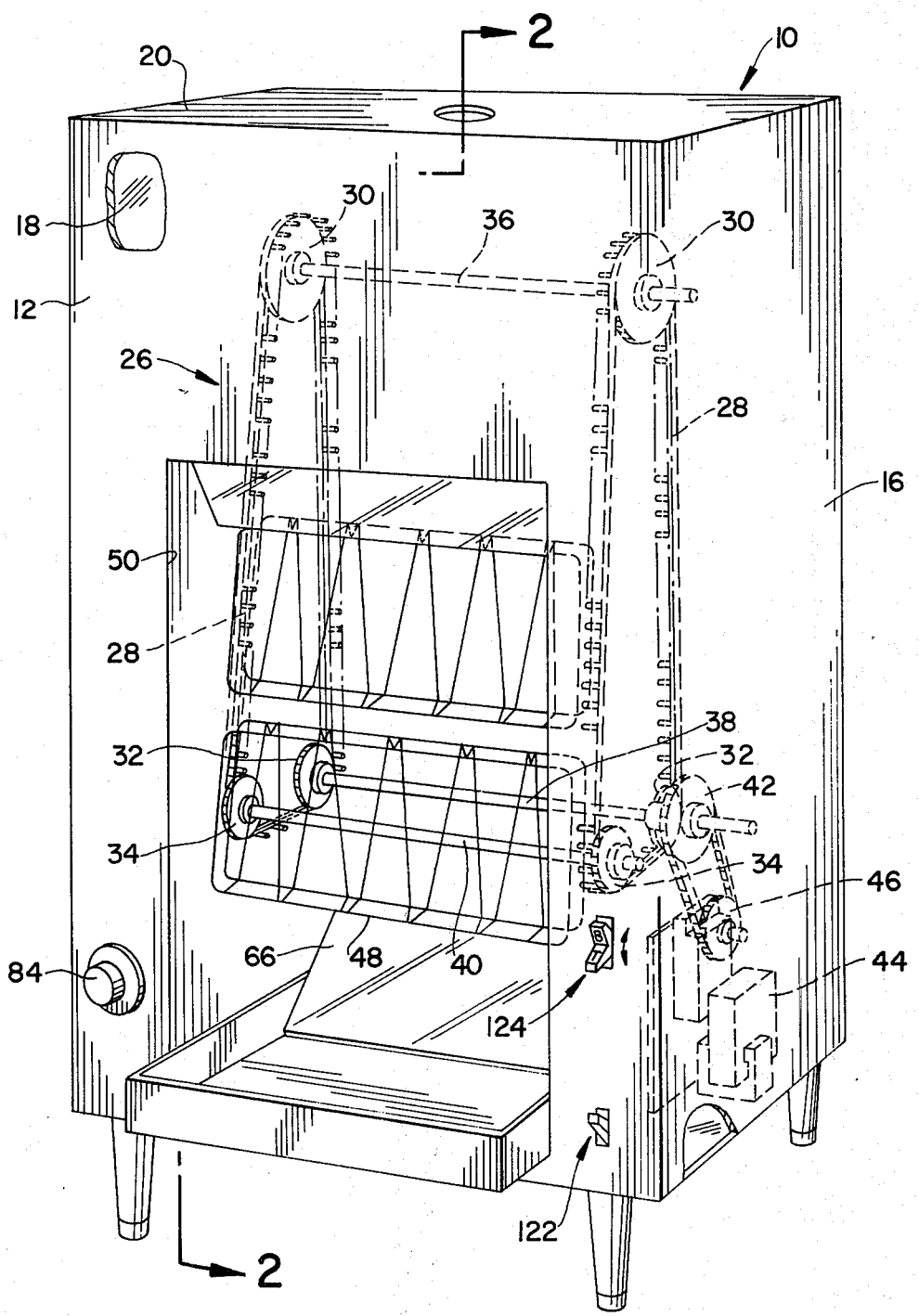
FIG. 1 is a perspective view of toasting apparatus made in accordance with the present invention.
Figure 2:
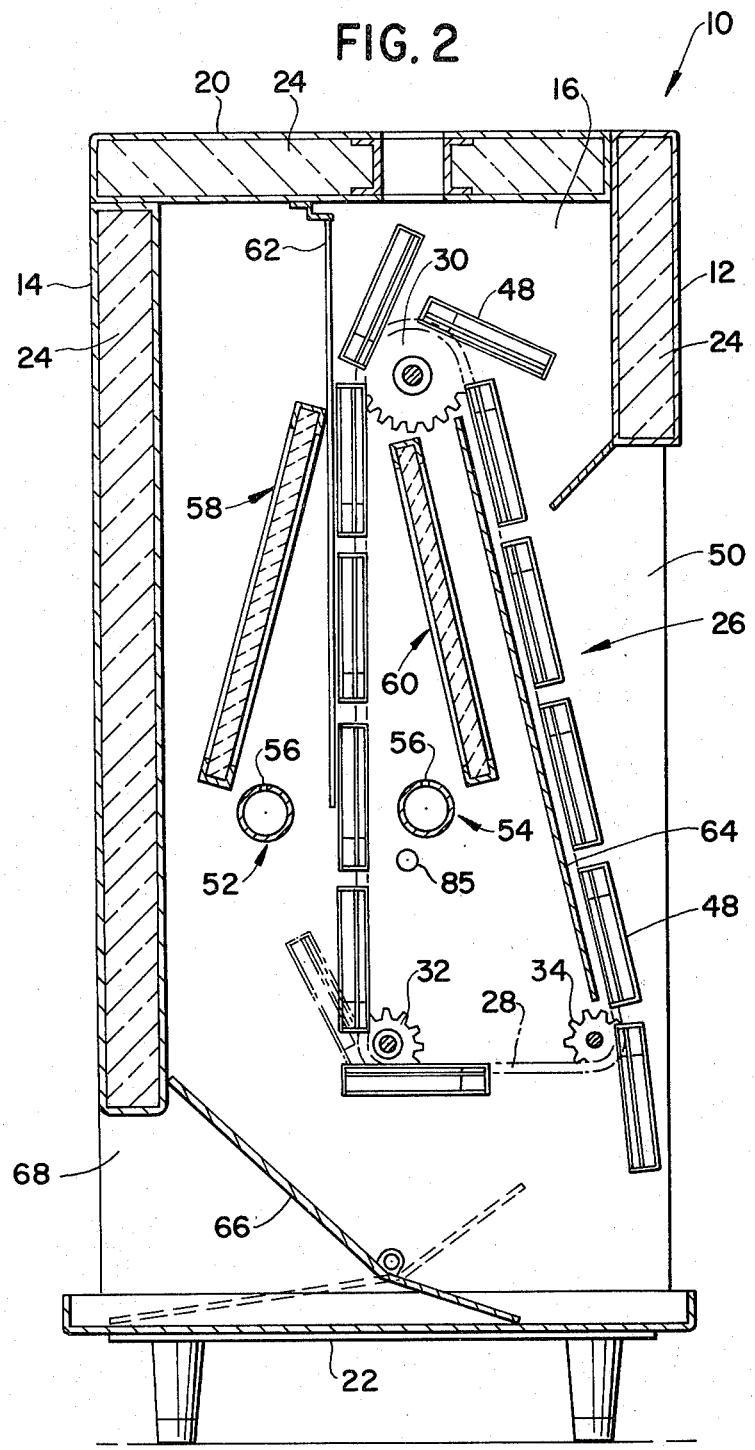
FIG. 2 is a sectional elevation of the apparatus illustrated in FIG. 1, the section being along line 2—2 in FIG. 1.
Figure 3:
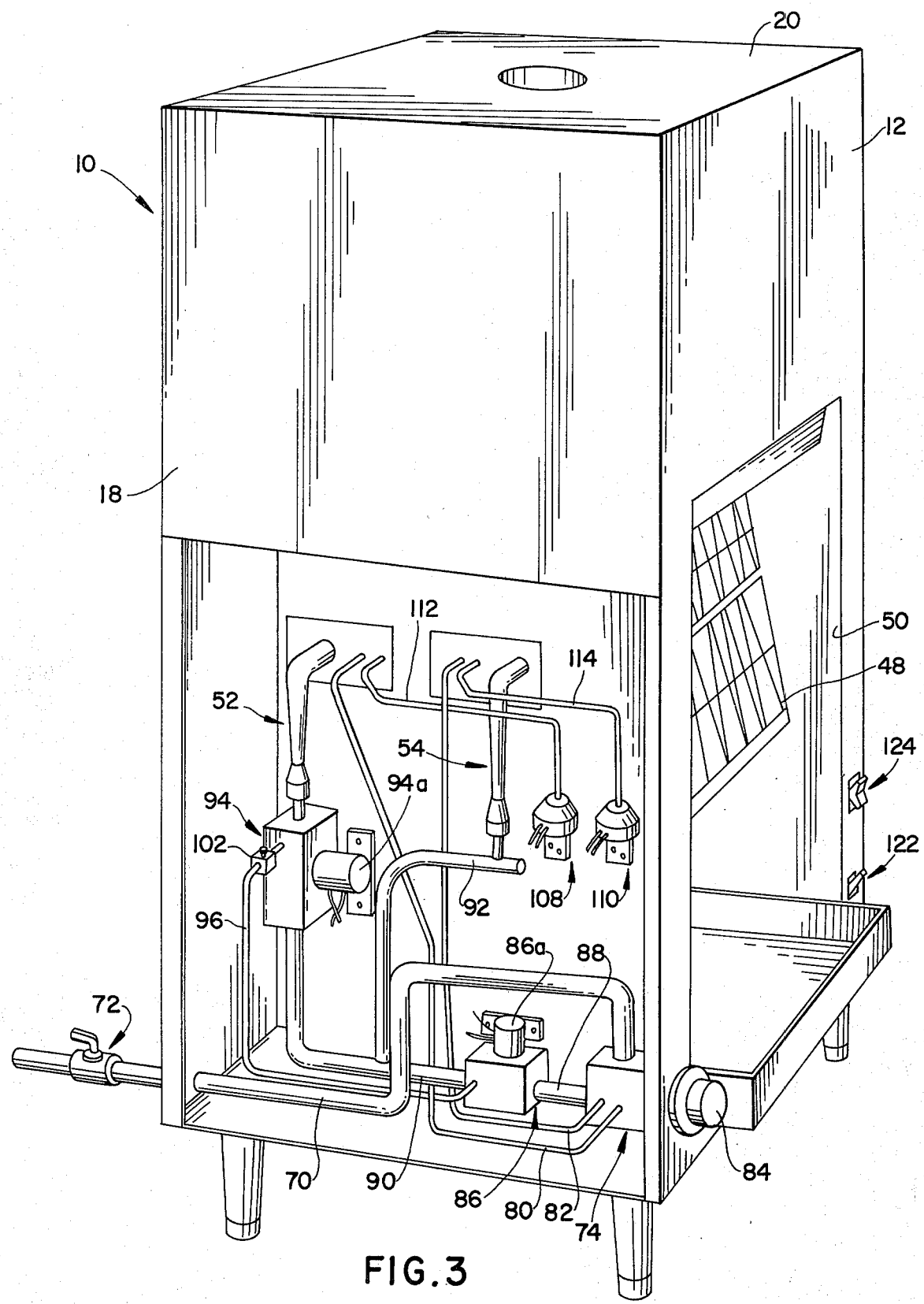
FIG. 3 is a perspective view of the apparatus with a sidewall of the housing removed to show gas supply and control components of the apparatus.

Referring now in greater detail to the drawings wherein the showings are for the purpose of illustrating a preferred embodiment of the invention only and not for the purpose of limiting same, toasting apparatus is illustrated in FIGS. 1–3 and which is comprised of a housing 10 having a front wall 12, a rear wall 14, opposed sidewalls 16 and 18, a top wall 20 and a bottom wall 22. All of the walls, except bottom wall 22, preferably are in the form of hollow sheet metal panels filled with suitable insulating material 24. The several walls of the housing are suitable interconnected with one another, and the interior surfaces thereof together define a toasting chamber.

A conveyor assembly 26 is disposed in the toasting chamber and is defined by a pair of endless sprocket chains 28 trained about corresponding upper sprocket wheels 30 and lower sprocket wheels 32 and 34. Sprocket wheels 30 are mounted on a common shaft 36, sprocket wheels 32 are mounted on a common shaft 38 and sprocket wheels 34 are mounted on a common shaft 40. Shafts 36, 38 and 40 are suitably supported within the housing for rotation relative thereto, and shaft 38 is provided with a drive sprocket 42 which is adapted to be driven by an electric motor 44 through a drive chain 46.

Sprocket chains 28 support a plurality of product carriers in the form of wire baskets 48 into which products to be toasted are placed for movement through the toasting apparatus. To facilitate product introduction into carriers, front wall 12 of the housing is provided with an entrance opening 50. In the embodiment illustrated, chains 28 of the conveyor assembly define a triangular conveyor flight having a first portion disposed adjacent entrance 50 and inclined inwardly of the toasting chamber, and a second portion extending generally vertically within the toasting chamber and through a toasting zone as described more fully hereinafter. Baskets 48 are pivotally interconnected with chains 28 to provide for the product baskets to lie parallel to the plane of the chains along the straight portions thereof and to swing out from the chains as illustrated in FIG. 2 of the drawing when the chains move around the sprocket wheels.

As best seen in FIGS. 2 and 3 of the drawing, the apparatus includes a pair of gas burner tubes 52 and 54 having outer ends disposed in the space between the inner and outer panels of sidewall 18, and having inner ends extending through the sidewall and into and across the toasting chamber. The inner ends of tubes 52 and 54 extend across the chamber toward sidewall 16 a distance at least corresponding to the width of the conveyor mechanism. Further, it will be appreciated that the ends of the tubes within the housing are provided along the lengths thereof with burner apertures 56.

The end of gas burner tube 52 disposed in the toasting chamber is positioned rearwardly of the vertical legs of conveyor chains 28, and a grid component 58 preferably of ceramic material extends upwardly from tube 52 and is inclined in the direction toward the conveyor. The corresponding end of gas burner tube 54 is disposed forwardly of the vertical legs of conveyor chains 28, and a grid component 60 preferably of ceramic material extends upwardly from tube 54 and is inclined toward rear wall 14 of the housing. Each grid unit is adapted to be heated by the flame from the corresponding burner, and the space between and along the grids and burner tubes defines a toasting zone through which articles are moved by the conveyor mechanism.

A wire grid or screen 62 extends through the toasting zone adjacent the vertical legs of chains 28 and serves to retain articles in the baskets during movement thereof through the toasting zone. Ceramic grids 58 and 60 and wire grid 62 are each suitably supported between the sidewalls of the housing and extend in the direction between the sidewalls a distance at least equal to the width of the article conveyor. The apparatus further includes a plate 64 of metal and/or insulating material disposed behind the inclined flight portion of the conveyor chains. Plate 64 provides a heat shield adjacent entrance 50 to prevent the egress of hot air from the toasting chamber through entrance 50.

In operation of the device as thus far described, articles to be toasted are placed by an operator on the food product carriers through entrance 50. The conveyor is operated to move the articles upwardly within the toasting chamber and then downwardly through the toasting zone. When an article carrier passes the lowermost end of the wire screen 62 the toasted article therein is free to fall from the carrier toward bottom wall 22 of the housing. Preferably, a pivotal deflector plate 66 is provided beneath the conveyor for selectively delivering the toasted articles forwardly toward entrance 50 or rearwardly towards an opening 68 at the bottom of rear wall 14.

In accordance with the present invention, as described more fully hereinafter, the flow of gas to burner tubes 52 and 54 is controlled to provide a toasting heat output for both burners or, alternatively, a non-toasting output for burner 52 and a toasting output for burner 54. When the flow rate provides a toasting heat output for both burners, both sides of an article on the conveyor are toasted as the latter passes through the toasting zone. When the flow rate to burner tube 52 is reduced, the side of an article on the conveyor facing burner tube 54 and grid 60 will be toasted and the side facing burner tube 52 and grid 58 will only be heated.

Figure 4:
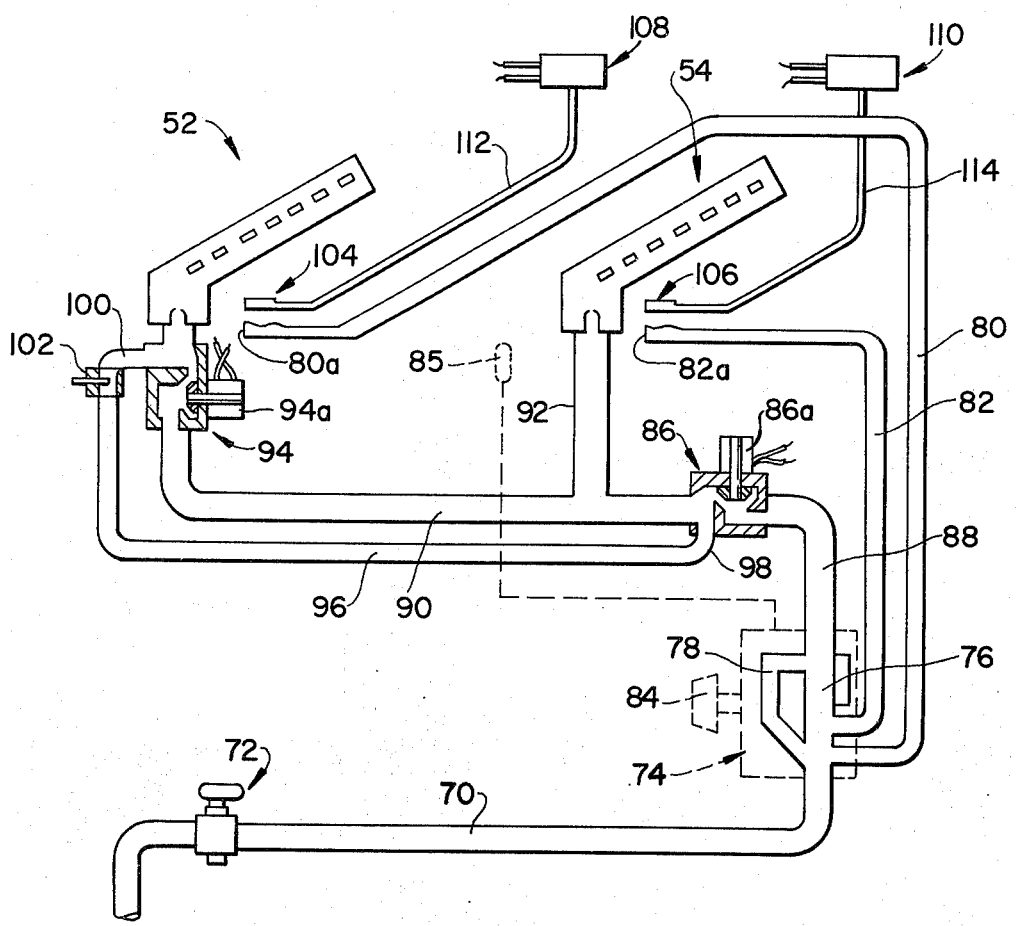
FIG. 4 is a schematic illustration of the gas supply circuit.

The manner in which the desired gas flow control is achieved will be best understood with reference to FIGS. 3 and 4 of the drawing which show the gas supply circuitry for the burners. More particularly, the apparatus is provided with a gas supply line 70 having an outer end connectable to a suitable source of gas, not shown, through a manual shutoff valve 72. The gas supply can be natural or bottled LP gas. Supply line 70 is connected to the inlet of a throttling regulator 74. In the embodiment disclosed, regulator 74 is a thermostatically controlled regulator commercially available from the Robertshaw Controls Company under the latter's model designation UNF Throttling Regulator. The latter regulator includes a main flow passageway 76 therethrough and a bypass passageway 78 in parallel with the main passageway. The regulator further includes outlets for connection to pilot flame lines 80 and 82 for burners 52 and 54, respectively. A control knob 84 is provided and includes "on", "bypass" and "off" positions.

Regulator 74 is adapted to modulate gas flow through main passageway 76 in accordance with the temperature sensed in the toasting chamber and includes a temperature sensing component 85 for this purpose disposed in the toasting chamber beneath burner tubes 52 and 54, as shown in FIG. 2. In the on position of the regulator, gas flow is permitted through main flow passageway 76, through bypass passageway 78, and to pilot flame lines 80 and 82. In the bypass position of the regulator, gas flow is permitted only through bypass passageway 78 and to pilot flame lines 80 and 82. In the off position of the regulator, all gas flow is shut off except that through pilot flame lines 80 and 82.

The outlet end of main passageway 76 is connected to the inlet end of a safety solenoid valve 86 through a line 88. Valve 86 includes a solenoid coil 86a and is operable as set forth more fully hereinafter to permit or shut off gas flow to the burners from regulator 74. A flow line 90 is connected to the outlet side of valve 86, and a line 92 connects line 90 in gas flow communication with burner 54. Line 90 leads to and is connected to the inlet side of a control solenoid valve 94, and the outlet side of valve 94 is connected to gas burner 52. Valve 94 includes a solenoid coil 94a and is selectively operable as set forth more fully hereinafter to open or close the passage through line 90 to gas burner 52. A bypass line 96 serves to deliver gas to burner 52 at a reduced flow rate when valve 94 is closed. In the embodiment shown, line 96 has an inlet end 98 opening into valve 86 downstream of the valve element therein, and an outlet end 100 opening into valve 94 downstream of the valve element in the latter valve. A manually adjustable valve 102 such as a needle valve is provided in bypass line 96 to facilitate adjusting the rate of gas flow therethrough.

Pilot flame lines 80 and 82 lead to pilot flame tips 80a and 82a, respectively, disposed adjacent the corresponding burner. In a well known manner, gas burners 52 and 54 are provided with corresponding pilot flame sensing devices 104 and 106, respectively. Sensing devices 104 and 106 are positioned to sense the presence or absence of a flame at the corresponding pilot flame tip and are connected to pilot flame switches 108 and 110 through lines 112 and 114. Any suitable flame sensing devices may be used and in the embodiment shown, the devices are operable to close the corresponding flame switch when a pilot flame is sensed.

Figure 5:
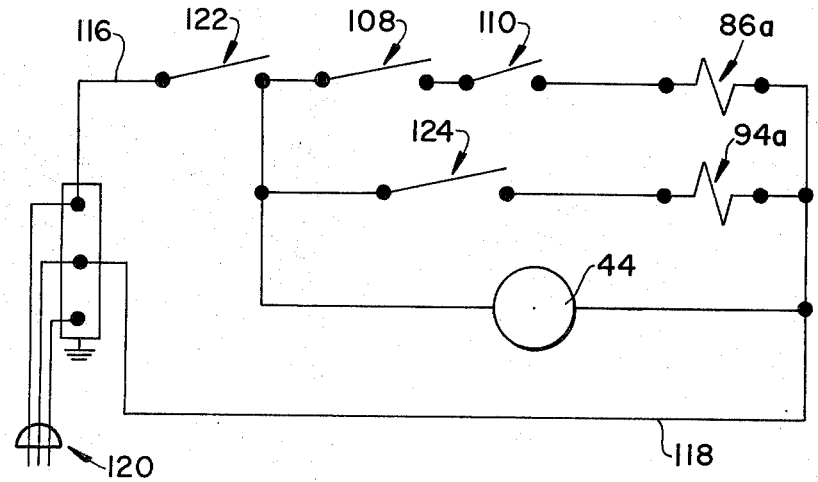
FIG. 5 is a schematic illustration of the electrical control circuitry for the apparatus.

Referring now to the schematic wiring diagram shown in FIG. 5, the control circuit for the electrical components of the toasting apparatus includes a pair of lines 116 and 118 connectable across a suitable source of electrical power such as a 120 volt AC source through a plug 120. An on-off switch 122 is provided in line 116 and is located on front wall 12 of the housing of the apparatus as shown in FIG. 1. Pilot flame switches 108 and 110 are connected across lines 116 and 118 in series with one another and with solenoid coil 86a of safety valve 86. A "selector" switch 124 is connected across lines 116 and 118 in series with solenoid coil 94a of control valve 94 and, together with the latter solenoid coil is connected in parallel with switches 108 and 110 and solenoid coil 86a. Drive motor 44 for the conveyor mechanism is connected across lines 116 and 118 in parallel with switches 108 and 110 and coil 86a and in parallel with switch 124 and coil 94a.

Operation of the various components described hereinabove to achieve control of the flow of gas to burners 52 and 54 is as follows. Assuming that both burner pilots are lit and that regulator 74 is in the on position and set for a predetermined temperature in the toasting chamber, main passageway 76 through the regulator is open and gas flows into line 88 to safety valve 86. Since both pilot valves are lit pilot flame switches 108 and 110 are closed connecting solenoid coil 86a in circuit therewith. If on-off switch 122 is open, however, solenoid coil 86a is not energized and valve 86 is closed to block gas flow toward the burners. This would be the condition during periods of non-use of the apparatus. Upon movement of switch 122 to the closed or on position, solenoid coil 86a is energized and valve 86 opens to permit gas flow through line 92 to burner 54 and through line 90 to solenoid valve 94. Opening of valve 86 also permits gas flow through bypass line 96 to burner 52.

If at this time selector switch 124 is open, solenoid coil 94a is not energized and valve 94 remains closed to block gas flow through the valve from line 90 to burner 52. Under these circumstances, burner 54 ignites with a full flame corresponding to the rate of gas flow thereto which is predetermined to achieve toasting of the side of the bread-like article facing the latter burner. At the same time burner 52 ignites but with a smaller flame due to the lower gas flow rate through bypass line 96 and valve 102 and which flow rate is predetermined to achieve heating of the side of the article facing burner 52. If selector switch 124 is now closed, solenoid coil 94a is energized and control solenoid valve 94 opens, whereby gas flows from line 90 through valve 94 to burner 52. Both burners 52 and 54 now operate with a full flame, whereby both sides of an article moved through the toasting zone are toasted. It will be seen, therefore, that merely by actuating switch 124 between the two positions thereof gas flow is controlled to selectively achieve toasting of both sides of the article or toasting of one side and heating of the other.

In the event that one of the pilot flames becomes extinguished, the corresponding pilot flame switch opens to open the circuit to solenoid coil 86a of safety valve 86. De-energization of solenoid coil 86a results in closure of valve 86, whereby gas flow to both burners and to bypass line 96 is prevented. Moreover, such flow is prevented until such time as the pilot is re-lit and the corresponding flame switch closes to close the circuit to solenoid coil 86a. Should the temperature within the toasting chamber exceed that for which regulator 74 is set, flow passageway 76 closes, but bypass passageway 78 remains open so that gas flow continues to burners 52 and 54. Such gas flow through the regulator bypass passageway reduces the flame size but prevents extinguishing the burners and thus avoids pilot blow out which can occur during burner ignition following a complete cut off of gas to the burners. Moreover, such continued burner operation at a low flame serves to maintain a more uniform temperature condition in the toasting chamber.

During periods of non-use of the toasting apparatus, it is only necessary to actuate on-off switch 122 to the off position thereof. This, of course, de-energizes solenoid coil 86a whereby valve 86 closes to prevent gas flow to the burners. Regulator 74 continues to deliver pilot gas to the pilot burners, whereby flame switches 108 and 110 remain closed. Accordingly, when switch 122 is subsequently closed coil 86a is energized to open valve 86, whereby gas flows to the burners in accordance with the position of selector switch 124.

As mentioned hereinabove, when control valve 94 is open both burners 52 and 54 operate with a corresponding full flame to provide heat outputs for toasting of both sides of an article moved through the toasting zone. Generally, however, the gas flow rate and thus the heat output of the two burners during this mode of operation is not the same. In this respect, the primary concern in toasting both sides of bread-like articles is the achievement of a uniform toasting color for the two sides. The toasting function of each of the two burners is affected by conditions within the toasting chamber including the positions of the two burners relative to the interior of the toasting chamber, and their locations in the chamber relative to the portion of the conveyor extending through the toasting zone. Therefore, it is generally necessary to provide for the heat outputs of the burners to be different to achieve the desired uniformity of color. However, the heat outputs of the burners during full flame operation thereof to achieve toasting by both burners is considerably greater than the heat output of burner 52 when the latter only provides a heating function.

As described hereinabove, the gas flow rates for the two burners are controlled to achieve the desired heat outputs thereof, namely a toasting heat output for both in one mode of operation and a toasting output for one and a heating output for the other in the second mode of operation. However, it will be appreciated that in a given burner system the flow rate required to achieve a predetermined heat output will vary depending on conditions such as the heat value of the fuel and the supply pressure. Thus, it will be understood that reference herein to gas flow rates is with regard to the flow rate necessary to achieve a desired heat output in given apparatus and under given fuel type and supply conditions.

To uniformly toast both sides of a bread-like article in apparatus structured as herein illustrated and described, the heat output of burner 54 which is closer to the entrance opening in the apparatus housing is greater than that of burner 52 which is further spaced from the housing entrance and is disposed behind the conveyor and articles moved through the toasting zone thereby. As an example in this respect, toasting of opposite sides of the article with uniformity in toasting color can be achieved with a heat output of burner 54 of about 19,600 Btu/hr. and a heat output of burner 52 of about 12,400 Btu/hr. In the same example, the rate of gas flow to burner 52 is reduced to provide a heat output of from 0 to about 6,200 Btu/hr. when the apparatus is operated to toast and heat the opposite sides of the article. It has been found, generally, that a reduction of about 50 percent in the rate of heat output of burner 52 provides heating without what would be considered appreciable toasting, and a reduction in the heat output of the latter burner beyond the 50 percent figure of course reduces the extent to which the corresponding side of the article is heated by the burner. Accordingly, the flow of gas through the restricted passageway to burner 52 in the disclosed embodiment could be reduced to 0 should a particular customer desire to toast one side of a bun half and rely only on the entrained heat within the housing of the apparatus to heat the other side of the bun.

The foregoing heat output rates are given by way of example only, and it will be appreciated that the heat output rates for the burners to achieve toasting by both burners will vary in accordance with design parameters for a given toasting apparatus including, for example, the size of the toasting chamber, conveyor speed, the rate of heat dissipation from the toasting chamber, ambient air flow characteristics through the chamber, and the like. Moreover, it will be appreciated that the heat outputs of the burners for the toasting operation thereof can vary depending on the desires of a user with regard to the lightness or darkness of the toasted product.

While considerable emphasis has been placed herein on the preferred control arrangement and the preferred arrangement of components in the control circuit, will be appreciated that many modifications can be made in the disclosed arrangement without departing from the principles of the present invention. For example, bypass line 96 could be omitted and a control valve arrangement could be employed in line 90 in place of valve 94 to provide the two rates of gas flow to burner 52. Further, while it is preferred that valve 94 be solenoid operated, it will be appreciated that the valve could be manually operated. Still further, where a bypass line such as line 96 is employed to direct gas flow at a lower flow rate to the corresponding burner, the upstream end of such bypass line could be at any location upstream of the valve 94. It will be appreciated too that the burner relationship can be reversed to provide for the front burner in the embodiment shown to have the toasting and heating functions rather than the rear burner. As many possible embodiments of the present invention can be made and as the foregoing and other changes can be made in the embodiment herein illustrated and described, it is to be distinctly understood that the foregoing descriptive matter is to be interpreted merely as illustrative of the present invention and not as a limitation.

What is claimed is:

1. In gas burner type apparatus for toasting bread-like products and including a housing having wall means defining a chamber, means including first and second gas burners defining a toasting zone in said chamber, conveyor means in said chamber for receiving and carrying products through said toasting zone and between said burners, and means for delivering gas from a source to each of said first and second burners, the improvement comprising: said means for delivering gas including gas passageway means between said source and said first and second burners, and selectively operable flow control means in said gas passageway means and having first and second operating modes, said flow control means in said first mode being cooperable with said gas passageway means for gas to be delivered continuously and simultaneously to each said first and second burners and at a corresponding first flow rate for each said burner, and said flow control means in said second mode being cooperable with said gas passageway means for gas to be delivered continuously and simultaneously to each said first and second burners and to said first burner at the first flow rate therefor and to the second burner at a second flow rate therefor, said second flow rate being less than either of said first flow rates of said first and second burners, whereby said first burner is continuously operated at said first flow rate therefor and said second burner is continuously operated simultaneously with said first burner and selectively at said first and second flow rates therefor.

2. The improvement according to claim 1, wherein said gas passageway means includes a primary gas passageway and means defining a restricted gas passageway in parallel flow relationship therewith, each said passageway opening to said second burner, said flow control means including a valve in said primary passageway and operable to open and close said primary passageway to gas flow therethrough to said second burner.

3. The improvement according to claim 1, wherein said gas passageway means includes primary passageway means having an upstream end, said first and second burners being connected to said primary passageway means at spaced locations downstream from said upstream end, said flow control means including first valve means in said primary passageway means between said upstream end and said second burner, said first valve means being operable when closed to prevent gas flow to said second burner through said primary passageway means, and said gas passageway means further including restricted passageway means bypassing said first valve means.

4. The improvement according to claim 3, wherein said valve is a solenoid valve, and electrical control circuit means for said valve including switch means for selectively connecting said solenoid valve across a source of electrical power.

5. The improvement according to claim 3, wherein said means defining a restricted passageway includes a flow passage and manually adjustable restriction means in said passage to vary the rate of gas flow therethrough.

6. The improvement according to claim 3, and second valve means in said primary passageway means upstream from said spaced locations, said second valve means being operable when closed to prevent gas flow to said one and other burners through said primary and restricted passageway means.

7. The improvement according to claim 6, wherein said first valve means is a solenoid valve, and electrical control circuit means for said solenoid valve including manually operable switch means for selectively connecting said solenoid valve across a source of electrical power.

8. The improvement according to claim 7, wherein said restricted passageway means includes a gas passage and manually adjustable restriction means to vary the rate of gas flow therethrough.

9. The improvement according to claim 8, and further including pilot means for each burner and flame sensing means for each pilot means, said flame sensing means each including a flame switch in said electrical control circuit means, each said flame switch being closed when said sensing means senses a flame at the corresponding pilot means, said second valve means being a solenoid valve having coil means in series with each of said flame switches in said electrical control circuit means, said coil means being energizable when both said flame switches are closed to open said second valve means, and said coil means being de-energized when either of said flame switches is open to close said second valve means.

* * * * *